(12) United States Patent
Lee

(10) Patent No.: US 7,497,410 B2
(45) Date of Patent: Mar. 3, 2009

(54) STAND OF A DISPLAY DEVICE

(75) Inventor: Jin Bum Lee, Goomi-si (KR)

(73) Assignee: LG Electronics Inc., Seoul (KR)

( * ) Notice: Subject to any disclaimer, the term of this patent is extended or adjusted under 35 U.S.C. 154(b) by 28 days.

(21) Appl. No.: 11/486,031

(22) Filed: Jul. 14, 2006

(65) Prior Publication Data
US 2007/0152125 A1 Jul. 5, 2007

(30) Foreign Application Priority Data
Dec. 30, 2005 (KR) ............... 10-2005-0136028

(51) Int. Cl.
*F16M 13/00* (2006.01)
*H05K 7/14* (2006.01)

(52) U.S. Cl. ............... 248/398; 248/125.8; 248/295.11; 248/297.11; 361/681

(58) Field of Classification Search ............... 248/398, 248/917, 919, 920, 922, 923, 224.51, 295.11, 248/297.11; 361/681, 682
See application file for complete search history.

(56) References Cited

U.S. PATENT DOCUMENTS

| | | | | |
|---|---|---|---|---|
| 2,604,884 A | * | 7/1952 | Walker | ............... 126/30 |
| 4,532,912 A | * | 8/1985 | Burnside, III | ............... 126/30 |
| 5,904,328 A | * | 5/1999 | Leveridge et al. | ......... 248/124.1 |
| 6,702,238 B1 | * | 3/2004 | Wang | ................. 248/125.8 |
| 6,712,321 B1 | * | 3/2004 | Su et al. | ................. 248/123.11 |
| 6,822,857 B2 | * | 11/2004 | Jung et al. | ................. 361/681 |
| 6,918,564 B2 | * | 7/2005 | Yen et al. | ................. 248/404 |
| 7,036,787 B1 | * | 5/2006 | Lin | ................. 248/676 |
| 7,124,984 B2 | * | 10/2006 | Yokouchi et al. | ......... 248/125.8 |
| 7,177,144 B2 | * | 2/2007 | Ha et al. | ................. 361/681 |
| 7,333,322 B2 | * | 2/2008 | Hwang et al. | ................. 361/681 |
| 2003/0154673 A1 | | 8/2003 | MacGregor et al. | |
| 2004/0256523 A1 | * | 12/2004 | Jeong et al. | ................. 248/125.9 |
| 2006/0038104 A1 | * | 2/2006 | Choi | ................. 248/370 |

FOREIGN PATENT DOCUMENTS

| | | |
|---|---|---|
| EP | 0058242 | 10/1981 |
| EP | 1312851 | 2/2007 |
| JP | 11316556 | 11/1999 |
| KR | EP1505333 | 2/2005 |
| KR | EP 1577601 | 9/2005 |
| WO | WO2005/064436 | 7/2005 |

* cited by examiner

*Primary Examiner*—Anita M King
(74) *Attorney, Agent, or Firm*—Ked & Associates, LLP

(57) ABSTRACT

Provided is a stand of a display device that can be reduced in its volume and allows a user to adjust a position of a display device more conveniently. The stand of a display device includes: a sliding unit for vertically moving a display device, the sliding unit mounted on the display device; a base unit for supporting the display device; and a hinge connection unit having a first end pivotally coupled to the sliding unit and a second end pivotally coupled to the base unit.

12 Claims, 12 Drawing Sheets

STAND OF A DISPLAY DEVICE

BACKGROUND OF THE INVENTION

1. Field of the Invention

The present invention relates to a stand, particularly height/tilt adjustable stand of a display device, and more particularly, to a height/tilt adjustable stand of a display device that can prevent the property of a spring tensioned in an auxiliary link from being deteriorated when the stand keeps its folding state for a long time, allow a main link to be automatically fixed when the stand folds; stably maintain the folding state of the stand, and be reduced in its volume in the folding state to reduce the package volume.

2. Description of the Related Art

Generally, a stand for a display device has a variety of adjusting units for rotating, tilting, swiveling, raising, and lowering the display device.

A related art stand having two hinges for adjusting its height/tilt includes a base unit placed on a horizontal surface and a hinge connection unit for connecting the base unit to a display device body to adjust the tilt of the display device body.

In the related art stand of a display device having such a dual hinge structure, the tilt of the display device can be adjusted but it is difficult to adjust the height. Even when the height is adjustable, the height adjustable range is limited by the length of the hinge connection unit.

When a separate height adjustable unit is used, the structure of the stand is complicated. Furthermore, since the separate unit is formed of metal and coupled to the stand, it is vulnerable to an external impact. Furthermore, the number of parts increases, thereby increasing the overall volume. That is, the separate height adjustable unit includes a sliding assembly formed of metal and an outer body enclosing the sliding assembly. Therefore, the number of parts increases, thereby increasing the manufacturing cost.

There is also a stand of a display device having a link unit disposed between the display device body and the base unit. The link unit includes a main link connecting the base unit to the display device body and auxiliary links provided at sides of the main like to control the tilt of the display device body. By the auxiliary links, the display device body vertically extends upward and downward in a state where the display device body maintains its predetermined tilt.

Describing the auxiliary link in more detail, the auxiliary link generally includes two parallel links between which a spring is installed by which an angle the stand of a display device is uniformly maintained. The spring maintains its initial state while the stand vertically erected with respect to the horizontal surface. When the stand folds, the spring is tensioned. When the stand unfolds, the auxiliary links pulls toward each other by the compressing force of the spring such that the stand quickly returns to the initial state where it is erected with respect to the horizontal surface.

However, when the stand keeps its folding state for a long-time, the spring also keeps it tensioned state for a long time, thereby deteriorating the elastic property of the spring.

The stand further includes a fixing unit for fixing the folding state of the stand. The fixing unit is installed inside the base unit. When the stand folds, the fixing unit is associated with a coupling unit formed on one end of the link unit to fix the folding state of the link unit. In order to release the fixing unit, the user pulls a release lever placed on a lower portion of the stand to release the fixing unit from the coupling unit of the link unit.

The fixing unit is separately prepared and formed on the base. This increases the manufacturing cost.

In order to unfold the folded stand, the user lifts the stand and pulls the release lever. This is troublesome for the user.

SUMMARY OF THE INVENTION

Accordingly, the present invention is directed to a stand of a display device that substantially obviates one or more problems due to limitations and disadvantages of the related art.

An object of the present invention is to provide a stand of a display device that can conveniently adjust the height/tilt of a display device by providing a sliding unit for adjusting the height and a hinge connection unit for adjusting the tilt.

Another object of the present invention is to provide a stand of a display device that has a simple structure having the less number of parts.

Still another object of the present invention is to provide a stand of a display device that can prevent the property of a spring tensioned in an auxiliary link from being deteriorated when the stand keeps its folding state for a long time.

Still another object of the present invention is to provide a stand of a display device that allows a main link to be automatically fixed when the stand folds without using a separate fixing unit for fixing the main link.

Still yet another object of the present invention is to provide a stand of a display device that is reduced in its volume in the folding state to reduce the package volume.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a stand of a display device including: a sliding unit for vertically moving a display device, the sliding unit mounted on a rear surface of the display device; a base unit for supporting the display device; and a hinge connection unit having a first end pivotally coupled to the sliding unit and a second end pivotally coupled to the base unit.

In another aspect of the present invention, there is provided a stand of a display device including: a sliding unit for vertically moving a display device, the sliding unit mounted on a rear surface of the display device; a hinge connection unit pivotally coupled to the sliding unit and extending downward; and a base unit pivotally coupled to the hinge connection unit and having an opened curve section.

In still another aspect of the present invention, there is provided a stand of a display device including: a sliding unit for vertically moving a display device, the sliding unit mounted on a rear surface of the display device; a hinge connection unit pivotally coupled to the sliding unit and extending downward; and a base unit pivotally coupled to the hinge connection unit and having a connecting portion connected to the hinge connection unit and legs extending from opposite ends of the connecting portion.

According to the present invention, the user can conveniently adjust the height and angle of the display device. The property of the spring is not deteriorated even when the folding state of the stand keeps for a long time. Since the main link can be fixed by itself when the stand folds, the structure of the stand can be simplified and the folding/unfolding of the stand can be effectively realized. Furthermore, since the folded volume of the stand can be reduced, a relatively large number of stands can be transported at a time and thus the distribution cost can be reduced.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
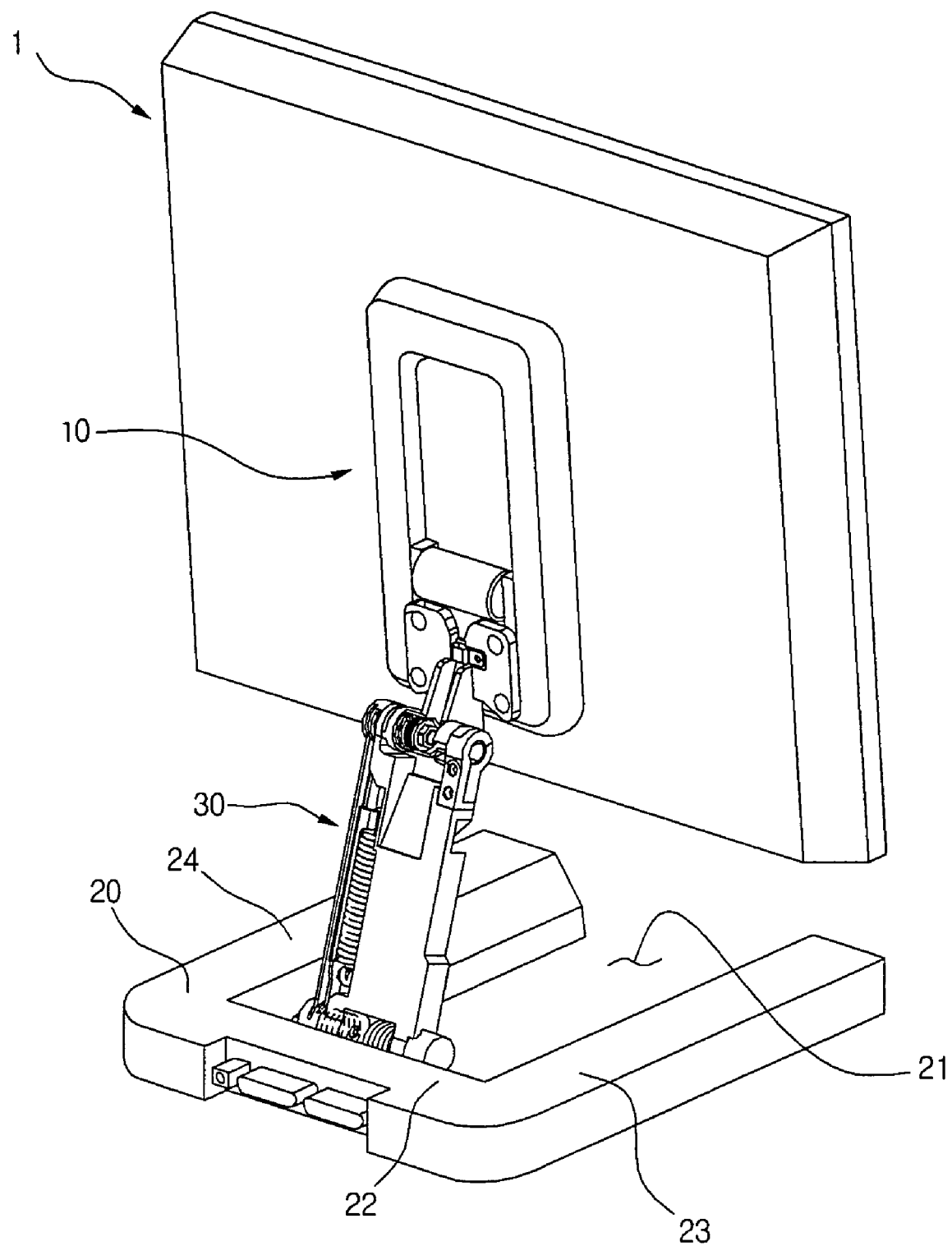
FIG. 1 is a rear perspective view of a display device to which a stand of a display device according to an embodiment of the present invention is applied.
Figure 2:
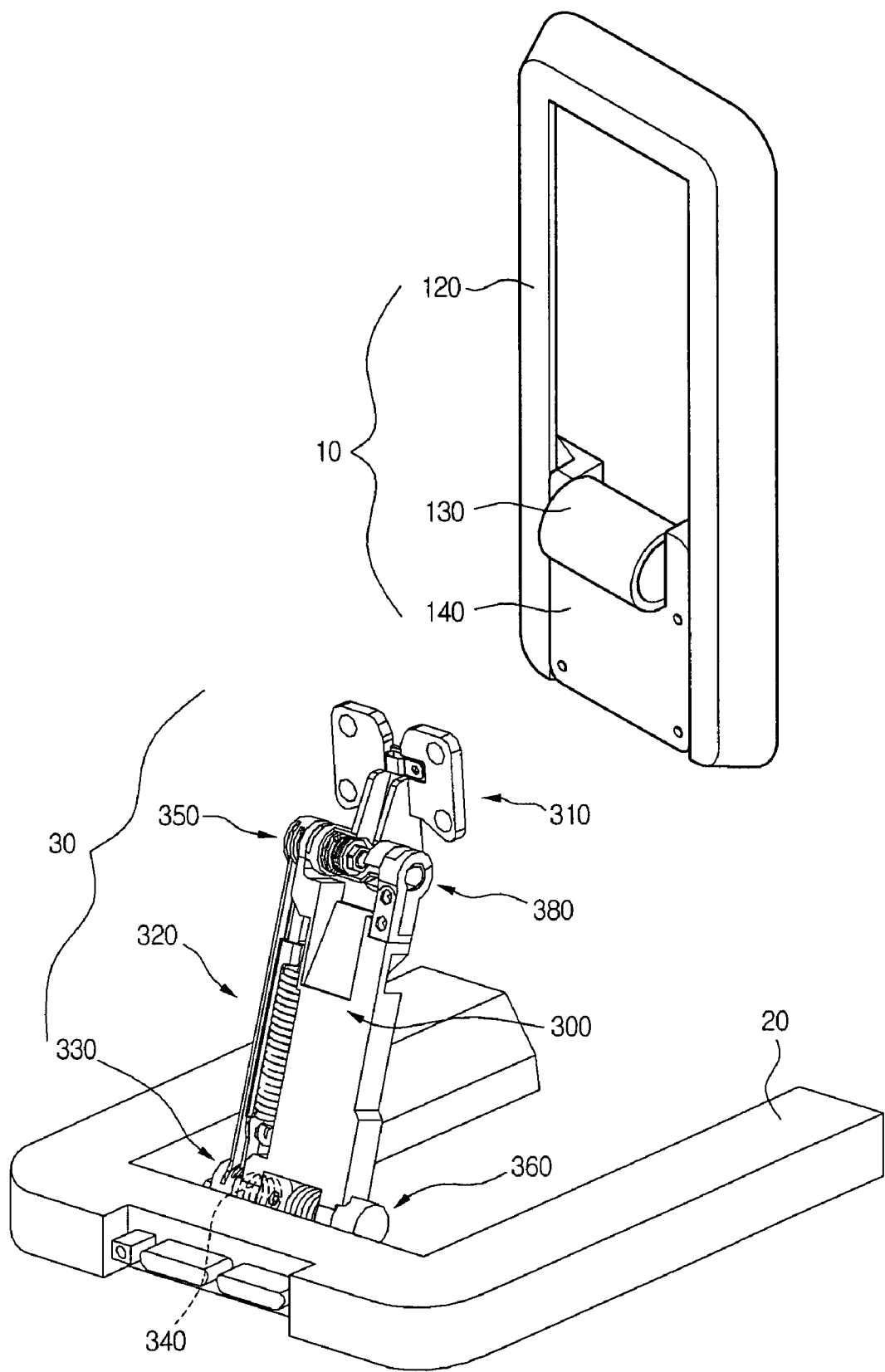
FIG. 2 is a rear perspective view of the stand of a display device of FIG. 1 when a sliding unit is separated.

FIG. 1 is a rear perspective view of a display device to which a stand of a display device according to an embodiment of the present invention is applied and FIG. 2 is a rear perspective view of the stand of a display device of FIG. 1 when a sliding unit is separated.

Referring to FIG. 1, a stand of a display device according to an embodiment of the present invention includes a sliding unit 10 for adjusting a height of a display device 1, a base unit 20 placed on a horizontal surface to support the display device, and a hinge connection unit 30 having a first end pivotally coupled to the sliding unit 10 and a second end pivotally coupled to the base unit.

Referring to FIG. 2, the sliding unit 10 includes a guide rail unit 120 installed on the display device 1, an elastic member 130 one end of which is fixed inside the guide rail unit 120 and the other end of which is expandable along the guide rail unit 120, and a guide unit 140 moving along the guide rail unit 120 to expand and retract the elastic member 130.

Figure 3:
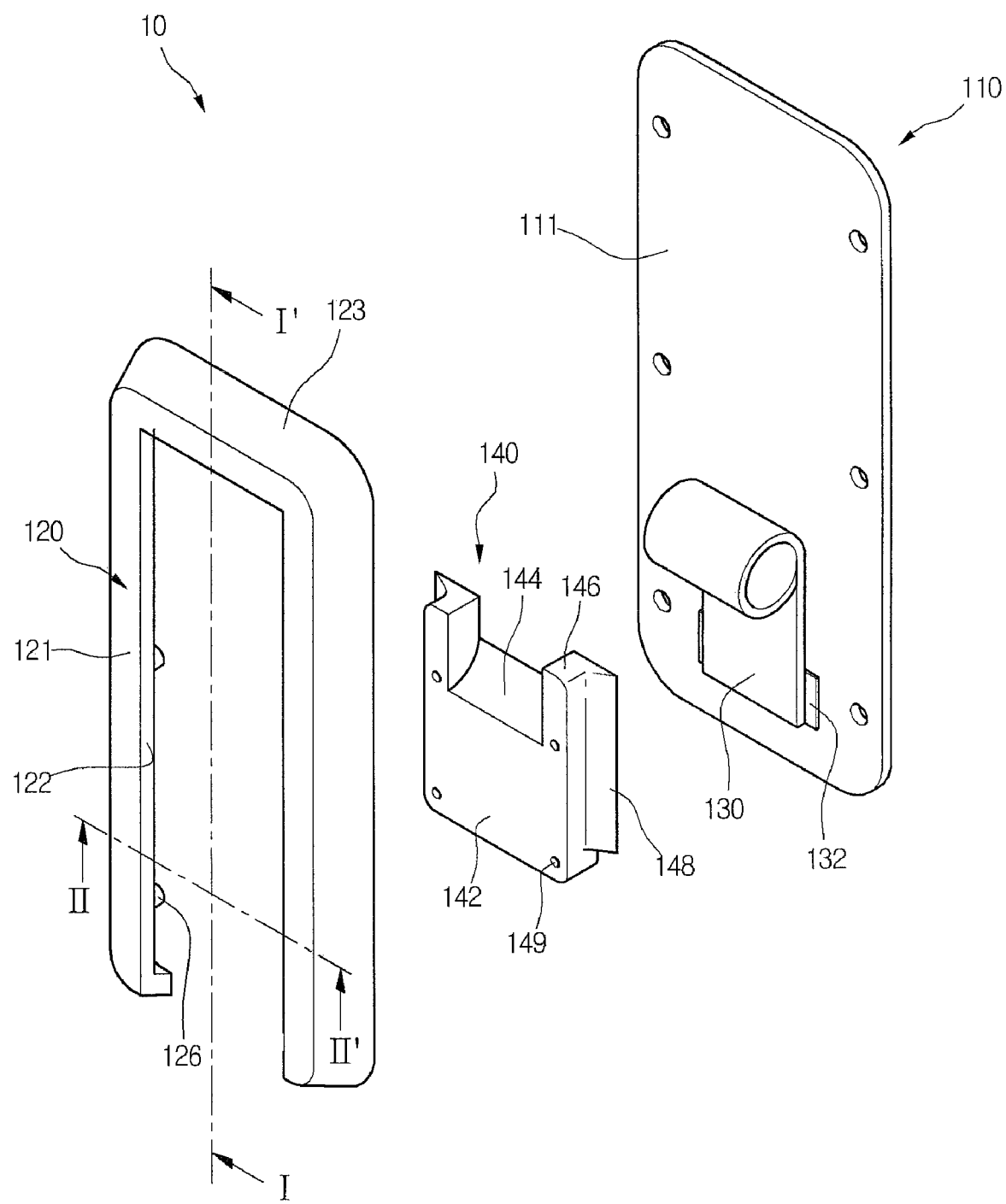
FIG. 3 is an exploded perspective view of the sliding unit of FIG. 2.

FIG. 3 is an exploded perspective view of the sliding unit 10.

Referring to FIG. 3, the guide rail unit 120 is fixed in a vertical direction on a rear surface of the display device 1. The guide unit 140 is disposed inside the guide rail unit 120 to vertically move. The elastic member 130 is formed of a leaf spring expanding or retracting by the movement of the guide unit 140.

An outer portion of the guide unit 140 is preferably fixed on a supporting unit 310 of the hinge connection unit 30.

The guide rail unit 120 or the guide unit 140 may be formed of plastic material to reduce the material cost and noise generated during the movement of the guide unit, to make swift movement.

Figure 4:
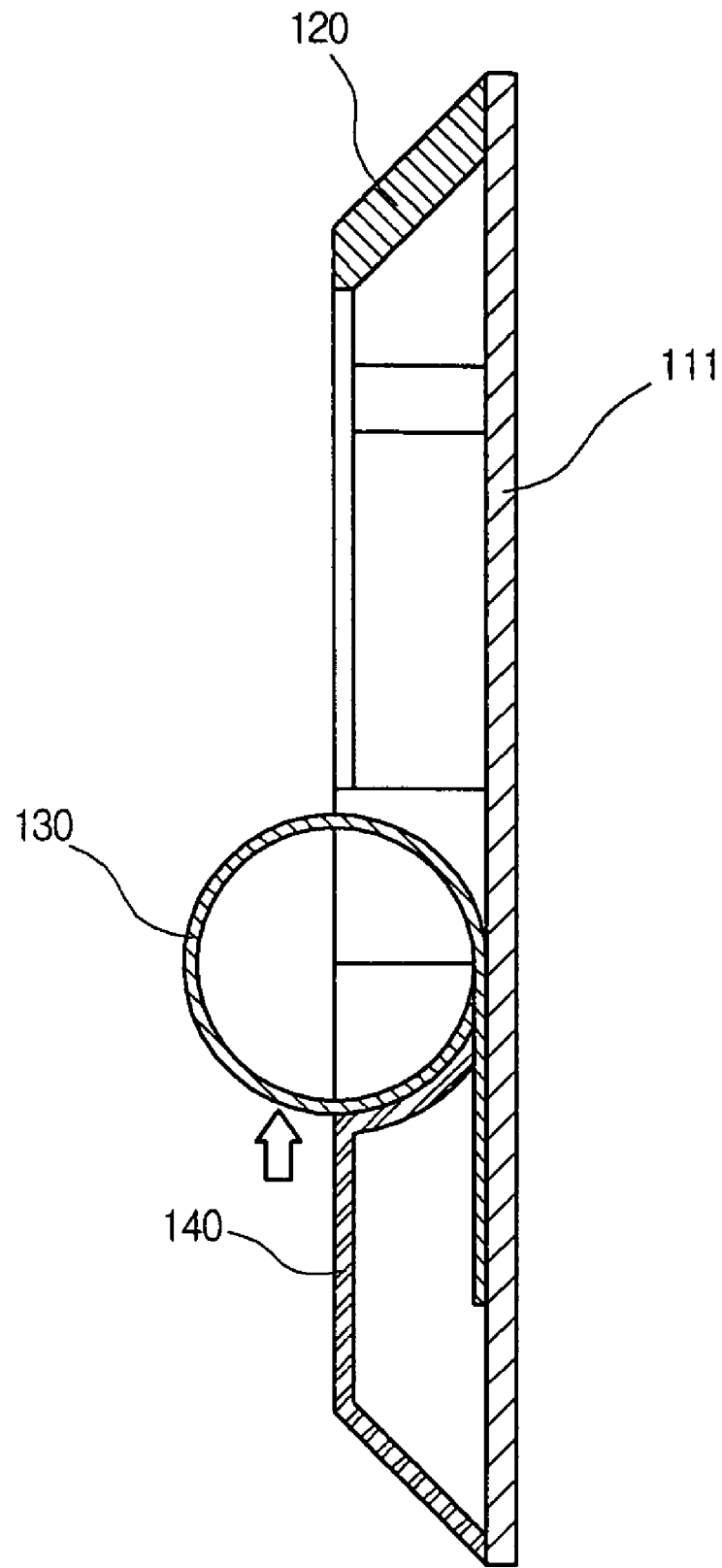
FIG. 4 is a longitudinal sectional view of the sliding unit of FIG. 3.
Figure 5:
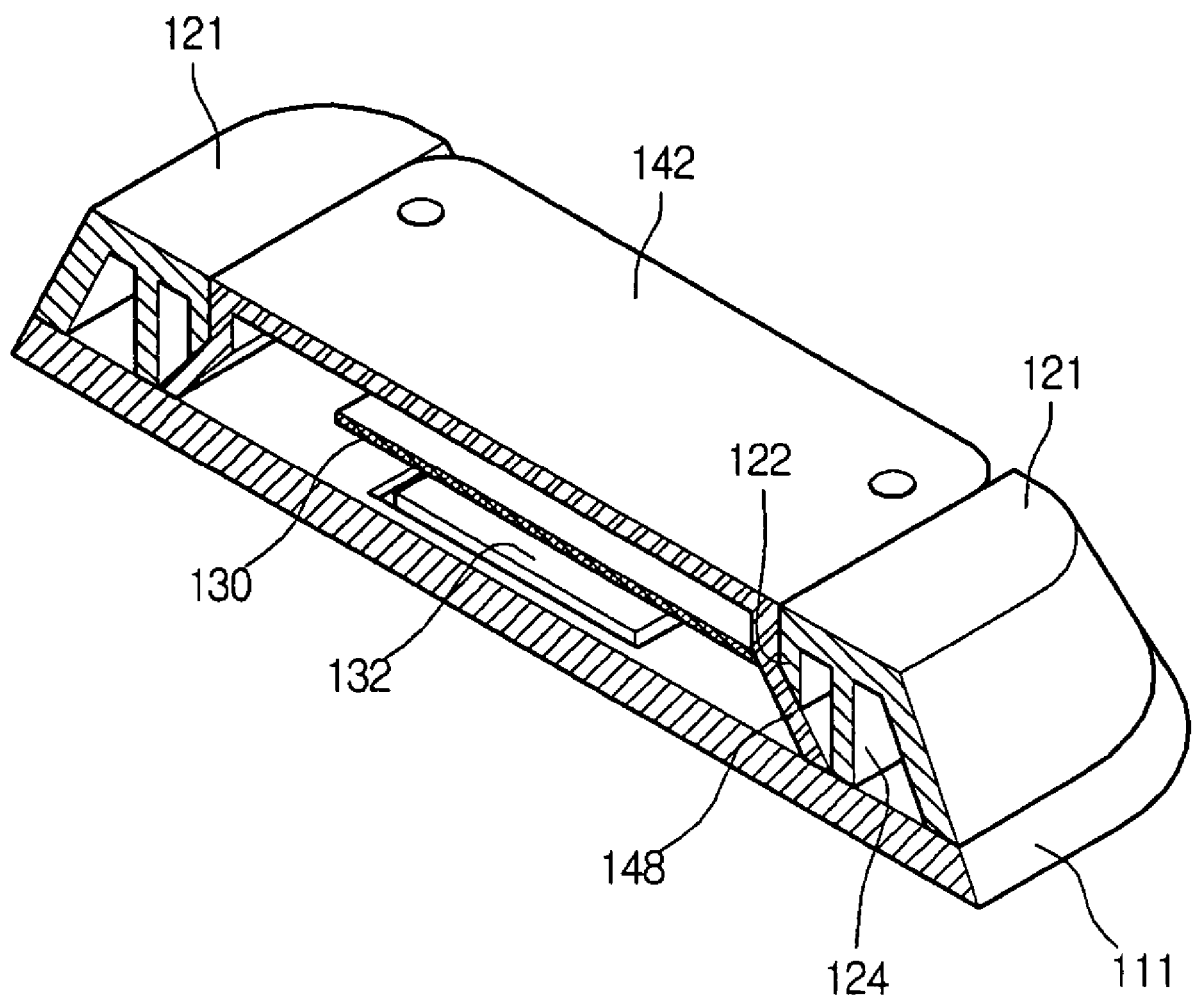
FIG. 5 is a horizontal sectional view of the sliding unit of FIG. 3.

FIG. 4 is a longitudinal sectional view of the sliding unit of FIG. 3 and FIG. 5 is a horizontal sectional view of the sliding unit of FIG. 3. In FIGS. 4 and 5, the guide rail unit 120, a rear fixing unit 110 and the guide unit 140 are collected at a proper location.

Referring to FIG. 3, the sliding unit 10 includes the guide rail unit 120 arranged in a vertical direction on the rear surface of the display device and the guide unit 140 movable in the vertical direction along the guide rail unit 120.

The guide rail unit 120 is coupled to the rear fixing unit 110 fixed on the rear surface of the display device 1.

The elastic member 130 is fixed inside the rear fixing unit 110. The elastic member 130 formed of a leaf spring is retractably placed on a guide body 142 of the guide unit 140.

In detail, the guide rail unit 120 includes a pair of guide rails 121 vertically arranged on the rear surface of the display device 1 and an upper portion 123 interconnecting the upper ends of the guide rail 121 to define an upper guide limitation.

Therefore, the guide rail unit 120 has a closed upper end and an opened lower end. The guide unit 140 is located in the guide rail unit 120 through the opened lower end.

The guide rails 121 are provided with guiding surface 122 contacting side surfaces of the guide unit 140.

The guiding surface 122 of the guide rail unit 120 contact the side surfaces of the guide unit 140 to allow the guide unit 140 to move along thereof.

Referring to FIG. 5, the guiding surfaces 122 do not contact the rear fixing unit 111 but are spaced apart from the rear fixing unit 111 by a predetermined distance.

The guide body 142 is provided at both sides with guide ribs 148 inclined at a predetermined angle. The guide ribs 148 are disposed between the rear portions of the guiding surface 122 and the rear fixing unit 111 to allow the guide body 142 to move along the guide rail unit 120.

The guide rail supporting ribs 124 (in FIG. 5) are formed on the guide rail unit 120. The guide rail supporting ribs 124 functions to support the guide rails 121 formed of the plastic material.

As shown in FIG. 5, side portions of the guide rails 121 are inclined such that a rear portion of each guide rail 121, which contacts the rear fixing unit 110, has a width greater than that of the front portion of each guide rail 121. This is to improve the appearance of the guide rails 121 since the guide rails 121 are parts defining the overall appearance of the display device 1.

Referring again to FIG. 3, coupling projections 126 are formed on the rear surfaces of the guide rails 121. The coupling projections 126 are coupled to guide rail coupling holes 129 formed on the rear fixing unit 110 so that the guide rails 120 can be fixed on the rear fixing unit 110.

The rear fixing unit 110 includes a rectangular plate 111 fixed on the rear surface of the display device 1. The rectangular plate 111 is provided with the guide rail coupling holes 129 to which the coupling projection 126 of the guide rails 121 are coupled.

The rectangular plate 111 is further provided with a spring fixing portion 132 for fixing the one end of the elastic member 130.

The spring fixing portion 132 may be formed of a bonding material such as bond. However, the present invention is not limited to this but any structure will be possible as far as it can fix the elastic member 130.

Meanwhile, in the present invention, the rear fixing unit 110 may be omitted. That is, the elastic member, the guide rail unit and the guide unit may be directly fixed on the rear surface of the display device. In this case, the rear surface of the display device 1 is provided with the coupling holes 129.

However, when the rear fixing unit is independently provided, the sliding unit is provided at an operational unit and thus it can be applied to various types of display devices.

The elastic member 130 is a windup leaf spring. Therefore, when the elastic member 130 is tensioned in a longitudinal direction, it can apply a uniform elastic force unlike the tension spring.

That is, in a state where one end of the elastic member 130 is fixed inside the guide rail unit 120, the elastic member 130 expands along the guide rail unit 120.

By using the elastic member 130 formed of the windup leaf spring, the load of the display device is supported at a predetermined height by the uniform elastic force without using a separate stopping member.

The elastic member may be other type of springs that identically function to the windup leaf spring.

In order to expand the elastic member 130, the guide unit 140 movable along the guide rail unit 120 in the vertical direction is provided.

The guide unit 140 includes a guide body 142 disposed between the guide rails 120, spring guide portions 146 extending upward from top side ends of the guide body 142, and the guide ribs 148 extending from side surfaces of the guide body 142 and provided with inclined surfaces. The guide ribs 148 of the guide rail 120 are disposed inside the guide rail unit 120.

While the guide unit 140 vertically moves along the guide rail unit 120, it expands the elastic member 130. That is, the guide unit 140 functions as a pusher pushing the elastic member 130.

Referring to FIG. 3, the guide body 142 of the guide unit 140 is provided at an upper end between the spring guide portions 146 with a rounded spring pushing portion 144 for supporting and pushing a lower portion of the elastic member 130.

A width of the pushing portion 144 may be identical to or greater than that of the elastic member 130.

That is, the elastic member 130 is located between the spring guide portions 146. A protruding length of each spring guide potion 146 may be identical to the diameter of the elastic member 130. The spring guide portions 146 guide the side surfaces of the elastic member 130 while the elastic member 130 expands and retracts.

Meanwhile, the guide ribs 148 are formed on the both side surfaces 143 of the guide body 142. The guide ribs 148 provided with the inclined surfaces contacting the guiding surface 122 of the guide rails.

Therefore, when the guide unit 140 moves vertically along the guide rail unit 120 in a state where the guide rail unit 120 is vertically erected, the guide unit 140 is not removed out of the guide rail unit 120.

Meanwhile, when the guide unit 140 moves to the lowermost end of the guide rail unit 120, lower ends of the guide ribs 148 are hooked on the lower end of the guide rails 121. Therefore, the guide unit 140 is not removed from the guide rails 121.

Meanwhile, the guide body 142 is provided with a plurality of coupling grooves 149 in which coupling projections formed on a supporting unit 310 of the hinge connection unit 30 will be fitted.

The coupling projections may be separately or integrally formed on the supporting unit 310.

As described above, the sliding unit is formed in a very simple structure only having the guide rail unit, the guide unit and the elastic member expandable by the guide unit.

Furthermore, the guide rail unit and the guide unit may be securely assembled with each other by the association of the projections and holes formed thereon without using screws. Therefore, there is no screw-loosen disadvantage at the combining portion.

The height adjusting operation of the sliding unit 10 will now be described.

Figure 6:
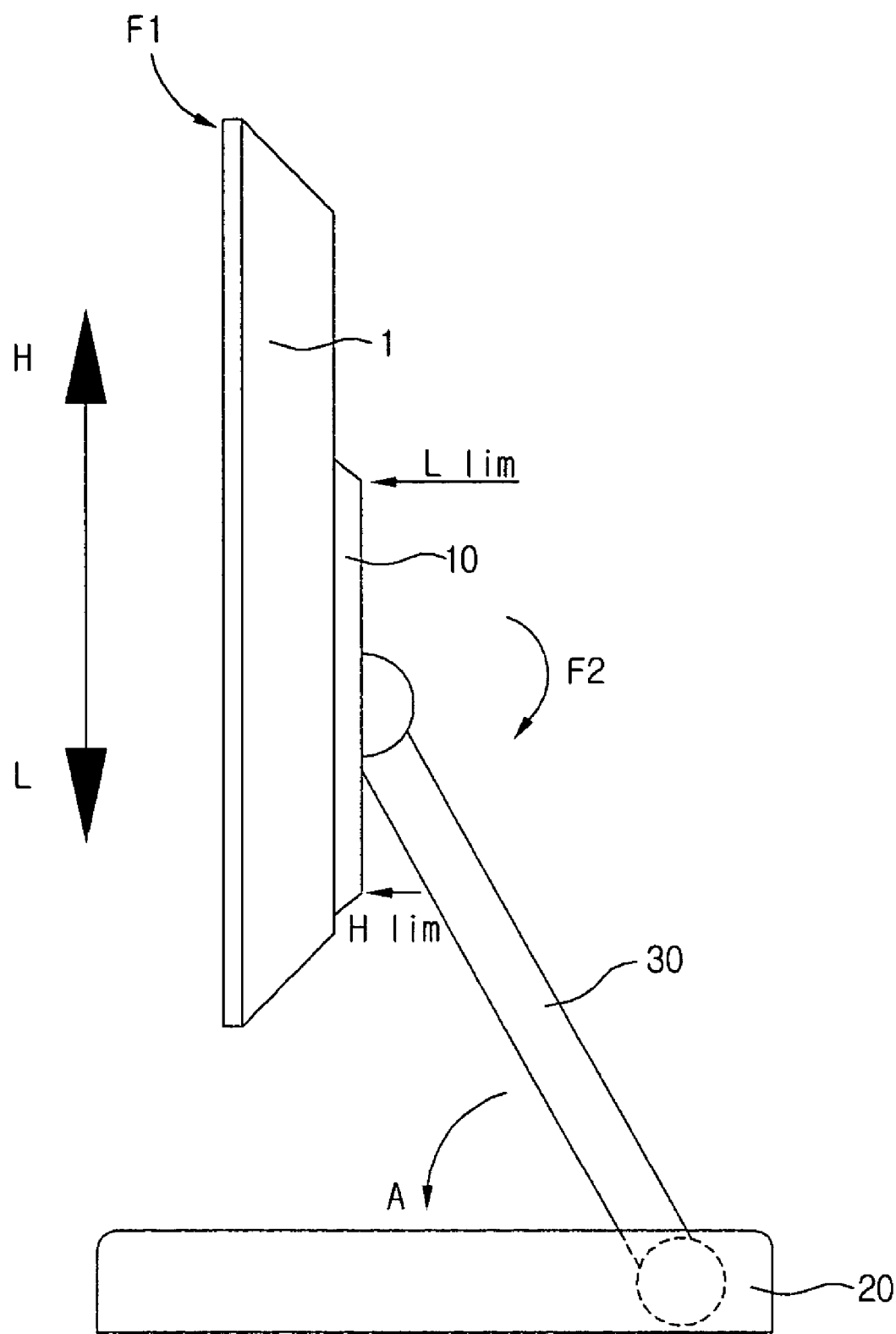
FIG. 6 is a view illustrating a height adjusting operation of the sliding unit of the stand of a display device according to an embodiment of the present invention.

FIG. 6 is a view illustrating a height adjusting operation of the sliding unit of the stand of a display device according to an embodiment of the present invention.

When the user intends to adjust the height of the display device 1, as shown in FIG. 6, the user moves the display device 1 in a vertical direction (see arrow H-L) Then, the guide unit 140 fixed on the supporting unit 310 of the hinge connection unit 30 vertically moves along the guide rail unit 120. When the guide unit 140 moves, the elastic member 130 disposed above the guide unit 140 expands or retracts.

When the user intends to lower the height of the display device 1, the user pushes down the display device 1. When the display device 1 is pushed down, the guide unit 140 fixed on the supporting unit 310 of the hinge connection unit 30 moves upward along the guide rail unit 120.

When the guide unit 140 moves along the guide rail unit 120, the guide body 142 expands the elastic member 130. That is, while the guide body 142 moves upward, the display device 1 moves downward.

At this point, when the user stops pushing down the display device 1, the expanding of the elastic member 130 stops. Therefore, the location of the display device 1 is fixed at the location where the expanding of the elastic member 130 stops. That is, an elastic force of the elastic member 130 for supporting the load of the display device 1 is generated at the location where the expanding of the elastic member stops. The elastic force is identical to the load of the display device 1 to stop the movement of the display device 1, thereby fixing the height of the display device 1.

Therefore, the height of the display device 1 can be adjusted within a range of the length of the guide rail unit. That is, the display device 1 can moves between a lowest limit Llim and a highest limit Hlim.

The hinge connection unit 30 will now be described in more detail with reference to the accompanying drawings.

Referring again to FIG. 2, the hinge connection unit 30 includes the supporting unit 310 for supporting the display device 1 by being coupled to the sliding unit 10, a link unit pivotally coupled between the base unit 20 and the supporting unit 310, a link hinge unit for hinge-coupling the supporting unit 310 to the link unit, a base hinge units for hinge-coupling the link unit to the base unit 20.

The link unit includes a main link 300 having a first end pivotally connected to the supporting unit 310 and a second end pivotally connected to the base unit 20, an auxiliary link 320 connected between the supporting unit 310 and the base unit 20 to pivot together with the main link 300 at an eccentric location from a pivot axis of the main link 300, and an elastic member (see 328 of FIG. 8) having a first end fixed on an imaginary pivot axis of the main link 300 and a second end fixed on the auxiliary link 320.

Figure 10:
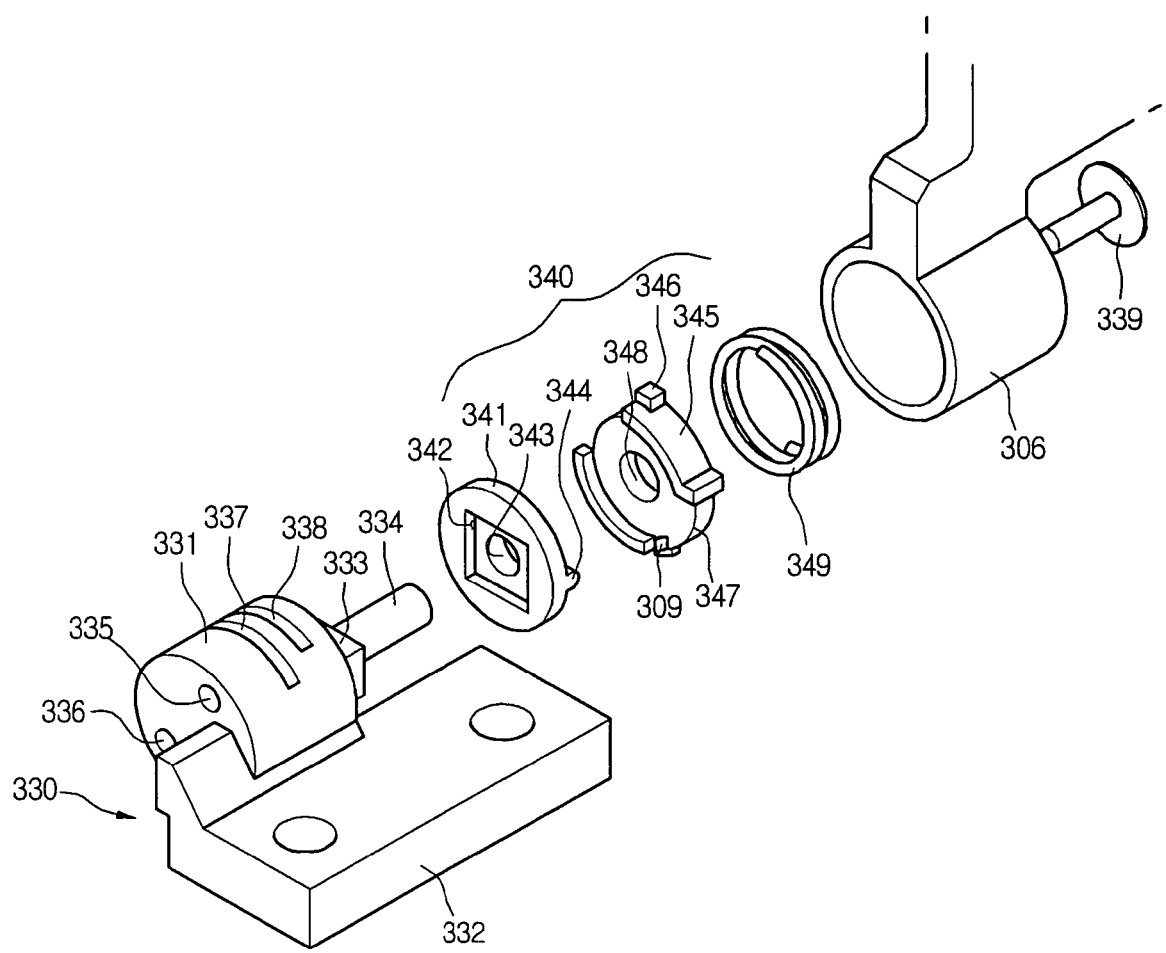
FIG. 10 is an exploded perspective view of a folding stopper of the stand of a display device according to an embodiment of the present invention.

The base hinge unit includes first and second base hinges 360 and 330 for connecting the main and auxiliary links 300 and 320 to the base unit 20, and a folding stopper (see 340 of FIG. 10). The folding stopper 340 will be described afterwards.

The link hinge unit includes first and second link hinges 380 and 350 for pivotally connecting the supporting unit 310 to the main link 300. The main link 300 is pivotally connected to the base unit 20 by the first and second base hinges 360 and 330.

The opposite ends of the auxiliary link 320 are respectively supported on the second link hinge 350 and a first auxiliary link supporting portion 331 located on the second base hinge 330. The elastic member 328 is installed inside the auxiliary link 320 and has a first end connected to the main link 300 and a second end connected to the auxiliary link.

The folding stopper 340 is installed on the first and second base hinges 360 and 330 to maintain the folding state of the main link 300. The folding stopper 340 will be described in more detail later.

The hinge connection unit 30 will now be described more in detail with reference to the accompanying drawings.

Figure 8:
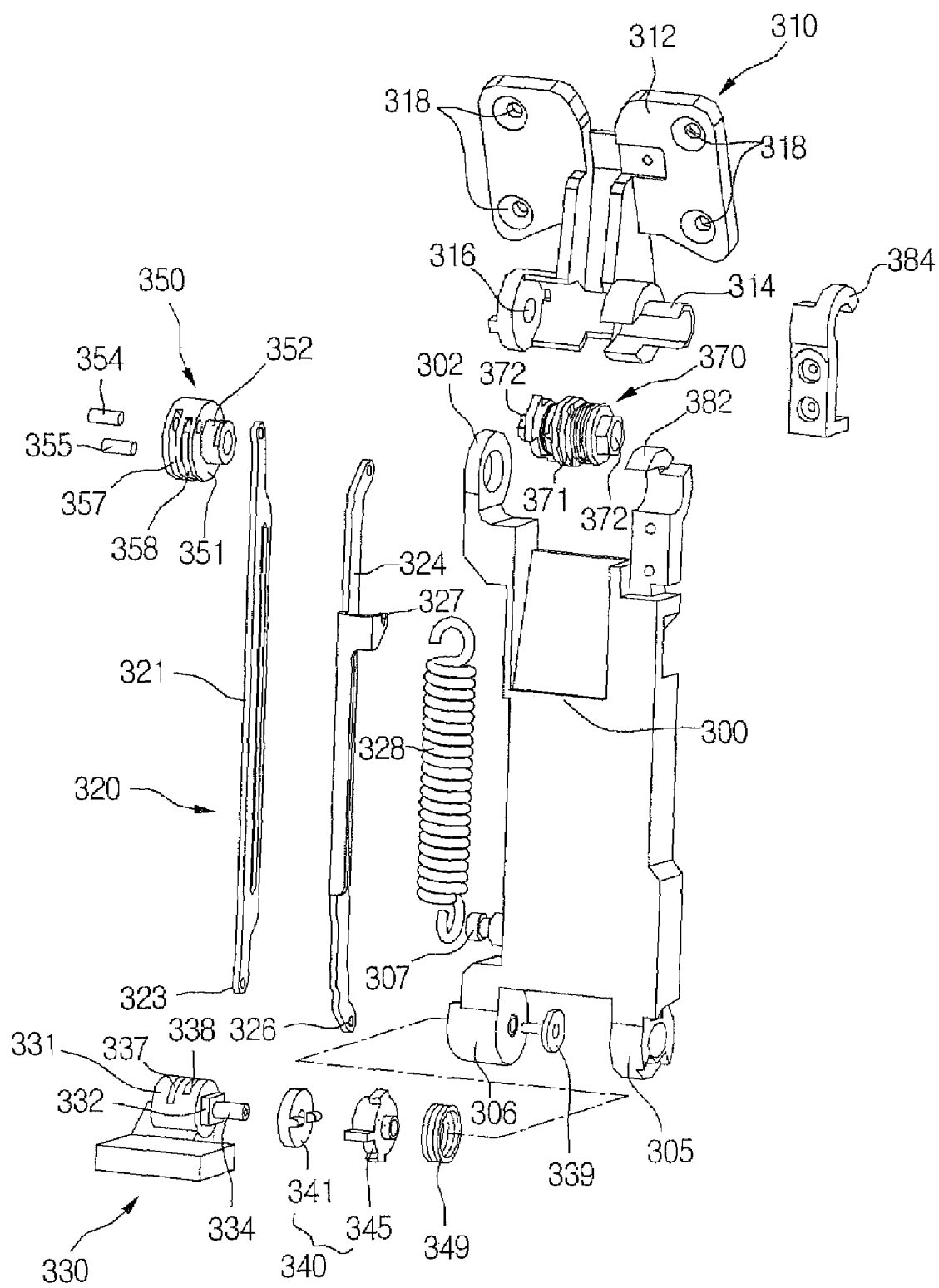
FIG. 8 is an exploded perspective view of a hinge connection unit for adjusting an angle of the stand of a display device according to an embodiment of the present invention.

FIG. 8 is an exploded perspective view of the hinge connection unit for adjusting an angle of the stand of a display device according to an embodiment of the present invention.

Referring to FIG. 8, the display device supporting unit 310 includes a supporting body 312 that will be fixed on the guide body 142 of the sliding unit 10. The supporting body 312 is provided with a plurality of coupling holes 318 for coupling to the guide body 142 of the sliding unit 10. That is, the guide unit 140 is coupled to the sliding unit 10 by screws inserted through the coupling holes 318.

The supporting body 312 is provided at a lower portion with a first hinge shaft 314 for forming a first link hinge 380 and a second hinge hole 316 in which a second link hinge shaft 372 is inserted.

The first hinge shaft 314 seats on a first hinge receiving portion 382 of the main link 300. A first hinge coupling member 384 is coupled to the first hinge receiving portion 382 so that the supporting body 312 can be pivotally fixed to the main link 300.

A second hinge spring member 370 is installed inside the second hinge hole 316. The second hinge spring member 370 includes a second hinge spring 371 for tilting the supporting unit 310 and a second hinge shaft 372 defining a hinge axis of the second link hinge 350.

One end of the second hinge shaft 372 is coupled to the second link hinge shaft 352 extending from an inner side surface of a second auxiliary link supporting portion 351 over a second hinge shaft receiving portion 302.

Meanwhile, the second auxiliary link supporting portion 351 is provided with second auxiliary link receiving portions 357 and 358 for receiving first ends 322 and 325 of auxiliary links 321 and 324 installed on a side surface of the main link 300. The auxiliary links 321 and 324 may be arranged in parallel to each other.

A rotational center of the auxiliary links 321 and 324 is eccentric from a rotational center B of the main link 300 by a predetermined distance.

First ends 322 and 325 of the auxiliary links 321 and 324 are pivotally fixed on the second auxiliary link supporting portion 351 by second auxiliary link fixing shafts 354 and 355. Second ends of the auxiliary links 321 and 324 are provided with through holes 323 and 326. The auxiliary links 321 and 324 are connected to the first auxiliary supporting portion 331 through the through holes 323 and 326. The first auxiliary link supporting portion 331 is provided with first auxiliary link receiving portions 337 and 338 for receiving the auxiliary links 321 and 324. The second ends of the auxiliary links 321 and 324 are pivotally fixed on the first auxiliary link receiving portions 337 and 338 by first auxiliary link fixing shafts 335 and 336.

The second base hinge 330 for hinge-coupling the main link 300 to the base unit 20 is disposed under the first auxiliary link receiving portions 337 and 338.

The folding stopper 340 is formed on a side surface of the second base hinge 330 to stop the pivotal motion of the main link 300 when the main link 300 folds. This will be described in more detail later.

Meanwhile, a main spring 328 is installed inside the auxiliary link 324 close to the main link 300. The main spring 328 has a first end fixed on a second main spring supporting projection 327 formed on an inner-upper portion of the first auxiliary link 324 and a second end fixed on a first main spring supporting projection 307 formed on a lower-side portion of the main link 300.

The main link 300 is provided at a lower end with first and second base hinge receiving portions 305 and 306 for pivotally connecting the main link 30 to the base unit 20.

Figure 9:
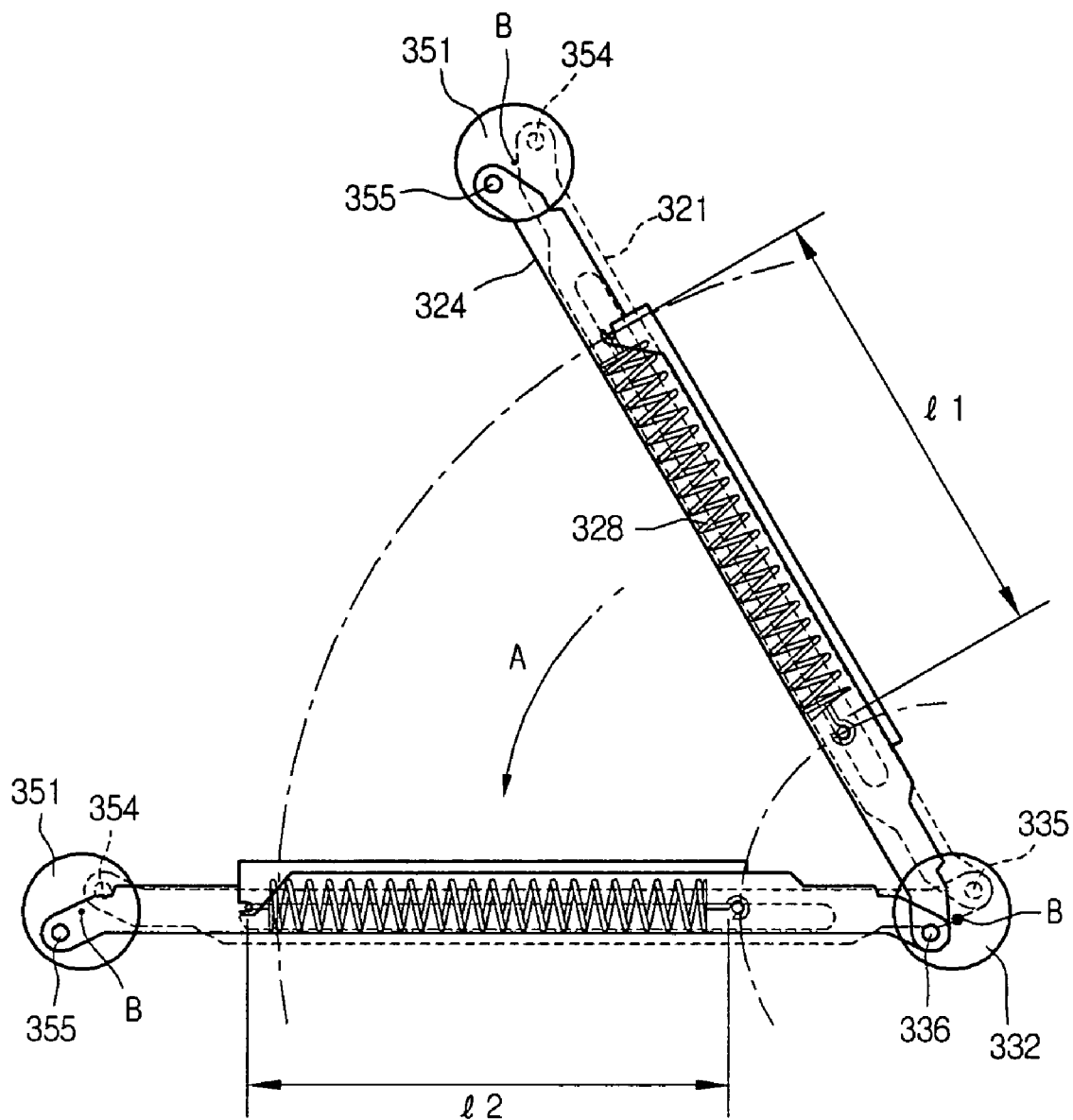
FIG. 9 is a side view of the operation of a main spring of the stand of a display device according to an embodiment of the present invention.

FIG. 9 is a side view of the operation of a main spring of the stand of a display device according to an embodiment of the present invention.

Referring to FIG. 9, when the stand of a display device is elected, the main spring 328 maintains its initial state. At this point, the main spring 328 has its minimum length l1 where an elastic force of the main spring becomes minimum.

When the user intends to adjust to a desired height and angle, as shown in FIG. 6, the user applies a force to the display device 1 in a direction F1. Then, the link hinges 350 and 380 rotate in a direction F2 and the main link 300, as shown in FIG. 9, rotates in an arrow direction A. As the main link 300 rotates, the auxiliary links 321 and 324 rotate together therewith.

At this point, even when the auxiliary links 321 and 324 rotates about a second base fixing bracket 332 fixed on the base unit 20, a length of the auxiliary links 321 and 324 do not vary. At this point, when the main link 300 rotates, the first end of the main spring 328 fixed on the main link 300 is uniformly spaced away from the rotational center B.

However, since the rotational center of the auxiliary links 321 and 324 is eccentric from the rotational center of the main link 300, the second end of the main spring 328 fixed on the first auxiliary link 324 moves away from the rotational center B of the main link 300.

Therefore, the main spring 328 expands to have an elastic force that acts for suppressing the pivot of the main link 300.

When the user stops applying the force at a desired location, the load of the display device 1 becomes even with the elastic force of the main spring 328, thereby display device stays at the desired location. Also, there is a frictional force happens to suppress the pivot of the main link 300 in the connecting portion of links.

Meanwhile, when the user further applies the force to fold the stand of a display device and thus the main link 300 folds to be parallel to the horizontal surface, the length of the main spring 328 becomes maximum 12. At this point, the elastic fore of the main spring can be maximized.

In this state, the main link is automatically fixed by the folding stopper 340, thereby maintaining its folding state. Accordingly, the main link 300 maintains its folding state. The operation of the folding stopper 340 for fixing the main link 300 will be described later referring FIG. 10 to 13.

When the main link 300 unfolds, the main link 300 returned to its initial position by the elastic force of the main spring 328. At this point, since one end of the mainspring 328 is fixed on the main link 300, the expanded one end of the main spring 328 moves close to the rotational center B.

As described above, the main spring 328 is designed to expand and retract at a predetermined direction, i.e., toward or away from the auxiliary links. Therefore, the main spring is reduced in its expanding length as compared with the prior art spring that expands and retracts in both directions between the links. Therefore, since the expanding length of the main spring is reduced as compared with the related art spring when the stand of a display device folds, the possibility of the deterioration of the elastic property of the main spring is reduced even when the stand of a display device maintains its folding state for a long time.

Meanwhile, when the user intends to adjust only the height of the display device in a state where the display device 1 maintains its predetermined tilt, the height adjustment may be done by the mutual operation of the supporting unit 310 and the sliding unit 10 as well as by the mutual operation of the auxiliary links 321 and 324.

That is, the auxiliary links 321 and 324 operate as a quadric link, namely quadric crank mechanism. Therefore, when an external force is applied, the auxiliary links 321 and 324 rotate as the quadric link before the hinge provided at the connection portion of the hinge connection unit 30 and the supporting unit 310 rotates. As a result, the height of the display device is adjusted without variation of the tilt of the display device. Of course, a distance from the display device to the user can be simultaneously adjusted to a predetermined degree.

Figure 11:
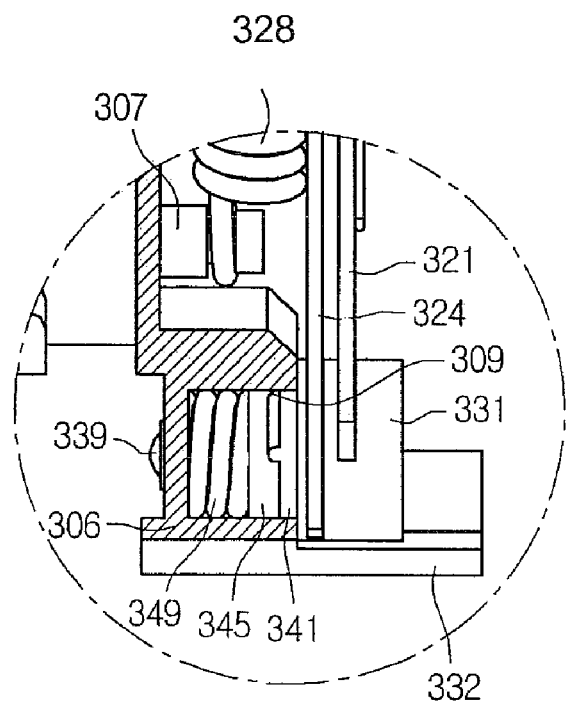
FIG. 11 is a front view of the folding stopper of FIG. 10 when it is assembled.

FIG. 10 is an exploded perspective view of the folding stopper of the stand of a display device according to an embodiment of the present invention and FIG. 11 is a front view of the folding stopper of FIG. 10 when it is assembled.

As described above, the folding stopper is a device to automatically fix the folding state of the stand.

Referring to FIG. 10, the folding stopper 340 includes a latch 341 and a rotational body 345. The latch 341 and the rotational body 345 are placed on a side surface of the first auxiliary link supporting portion 331 of a second base fixing bracket 332 and inserted in the second base hinge receiving portion 306.

That is, the base hinge shaft 339 penetrates the second base hinge receiving portion 306, the coil spring 349, the rotational body 345, and the latch 341 in this order and is fitted into the second base hinge shaft receiving portion 334.

A latch fixing portion 333 and the second base hinge shaft receiving portion 334 are formed on the side surface of the first auxiliary link supporting portion 331. The second base hinge shaft receiving portion 334 is inserted in a latch shaft receiving portion 343 of the latch 341. A fixing groove 342 is formed on a surface of the latch 341. The latch fixing portion 333 is fitted in the fixing groove 342 so that the latch 341 cannot rotate relative to the base unit 20.

A projection 344 is formed on a surface of the latch 341 where the second base hinge shaft receiving portion 334 is projected. The projection 344 may be formed on an edge of the latch 341.

The latch 341 corresponds to the rotational body 345 formed on the folding stopper and pivoting with the main link. A rotational body shaft receiving portion 348 is formed on a center of the rotational body 345. The rotational body receiving portion 348 is pivotally fitted in the second base hinge shaft receiving portion 334. The rotational body 345 contacts a portion of the latch 341. A projection 346 is formed on an outer circumference of the rotational body 345. The projection 346 is fixedly hooked inside the second base hinge receiving portion 306. Therefore, the rotational body 345 rotates together with the rotation of the main link 300.

In addition, a radial cutting portion 347 is formed on the surface of the rotational body 345 which contacts the latch 341 so that the projection 344 of the latch 341 can move along the radial cutting portion 347 when the rotational body 345 rotates. The radial cutting portion 347 extends in a radial direction and has a depth identical to a height of the projection portion 344 of the latch 341.

Referring to FIG. 11, one end of the radial cutting portion 347 contacts the projection 344 of the latch 341 when the main link 300 is erected. A hook step 309 is formed on a portion of the lower surface of the radial cutting portion 347.

The hook step 309 functions as a stopper stopping the movement of the projection 344 of the latch when the rotational body 345 rotates relative to the latch 341. This will now be described in more detail.

Figure 12:
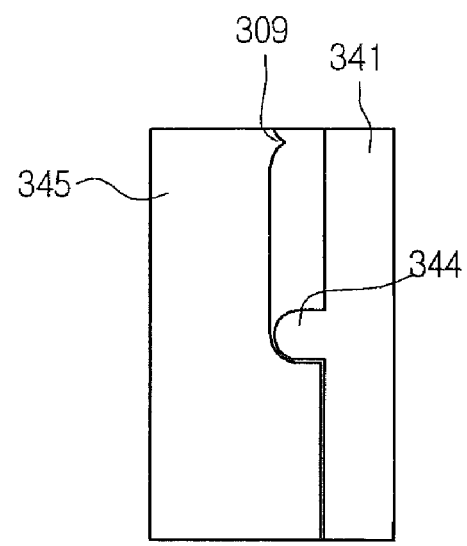
FIG. 12 is a view of the folding stopper of FIG. 10 before it operates.

FIG. 12 is a view illustrating a relative location of the latch of the folding stopper and the rotational body when the stand of a display device is erected. FIG. 12 is a view illustrating a relative location of the latch of the folding stopper and the rotational body when the stand of a display device is in the folding state.

Figure 13:
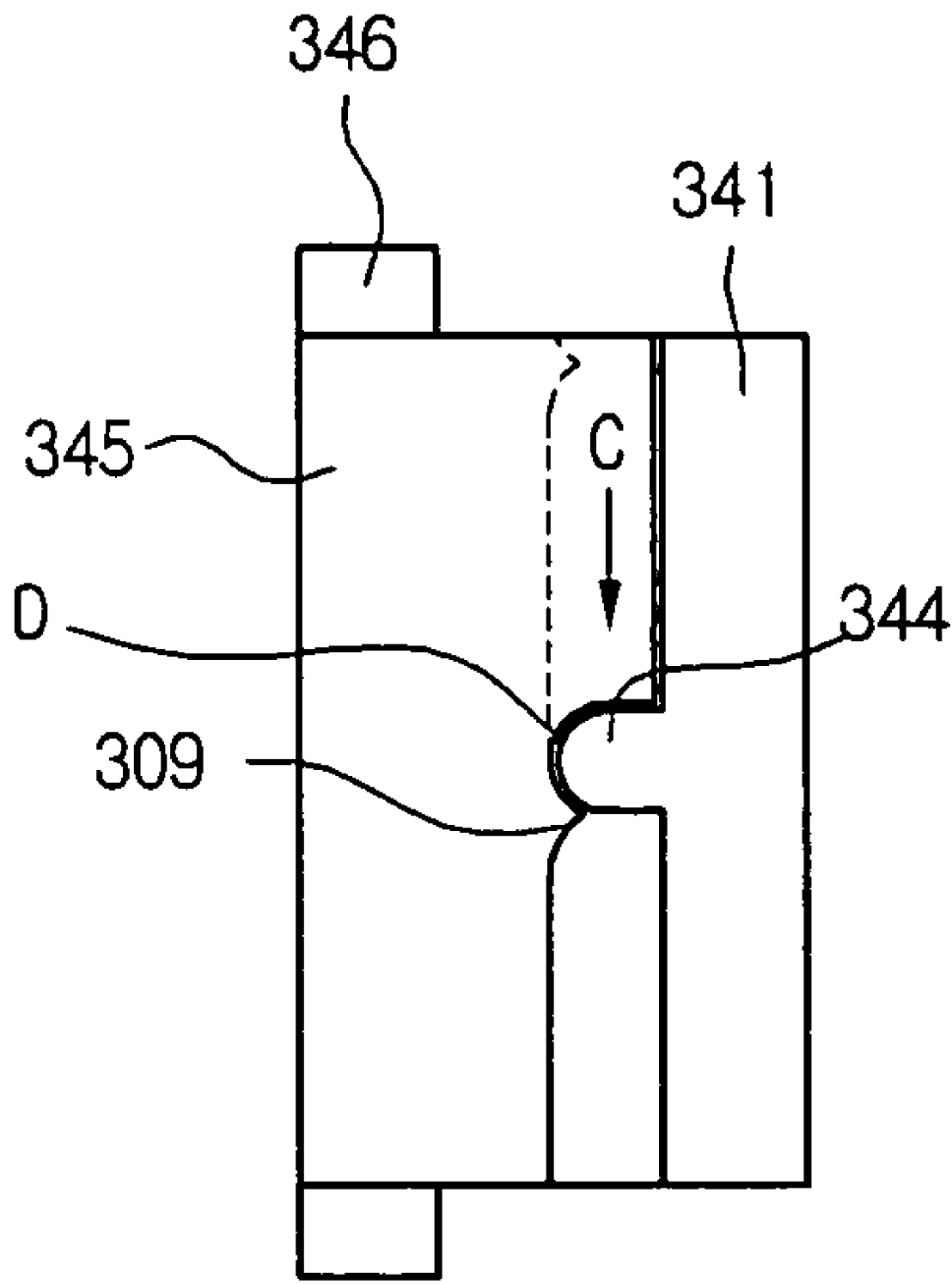
FIG. 13 is a view of the folding stopper of FIG. 10 after it operates.

Referring to FIGS. 12 and 13, when the stand of a display device is erected, the projection 344 of the latch 341 contacts an inner surface of the radial cutting portion 347 of the rotational body 345. When the stand of a display device folds to rotate the main link 300, the rotational body 345 rotates together with the main link 300 in an arrow direction C.

As the rotational body 345 rotates, the radial cutting portion 347 of the rotational body 345 moves over the projection 344 of the latch 341. As a result, the hook step 309 formed on the lower surface of the radial cutting portion 347 is to be adjacent to the projection 344. In order to allow the projection to move over the hook step 309, the user applies a predetermined force to the stand of a display device.

When a force higher than the predetermined force is further applied to the stand of a display device, the main link 300 fully folds. At this point, as shown in FIG. 13, the projection 344 formed on the latch 341 moves over the hook step 309 of the rotational body 345 and seats on a seating groove D formed on an end of the radial cutting portion 347 of the rotational body 345. A force of the hook step 309 for supporting the projection 344 of the latch 341 is preferably greater than an elastic force for suppressing the folding of the main spring 328.

By the above-described operation, the main link 300 is fixed by the folding stopper 340 located on a lower end of the main link 300 to suppress the pivot of the main link. Therefore, the main link 300 folds and is automatically fixed. That is, the folding state can be fixed by simply applying a predetermined force without using the related art locking device.

Meanwhile, when the user intends to release the folding state of the main link 300, the user pulls the main link 300 in a direction opposite to that for folding the main link 300 using a predetermined force higher than the force for folding the main link 300. By doing this, the projection 344 of the latch 341 that seats on the seating groove D of the radial cutting portion of the rotational body 345 moves reversely over the hook step 309.

After the projection 344 moves over the hook step 309, the main spring 328 installed on the auxiliary link applies a force against the folding state to the main link 300. Therefore, the main link 300 quickly returns the stand of a display device to the erected state even when the user does not apply the force to the main link 300.

Meanwhile, when the stand of a display device of the present invention is in the complete folding stand, the hinge connection unit 30 is fully inserted into an opened portion 21 of the base unit 20. Therefore, when the stand of a display device is in the folding state, the display device assembly including the stand is dramatically reduced in a thickness. This will now be described in more detail with reference to FIGS. 1 and 7.

Referring first to FIG. 1, the base unit 20 includes a straight connecting portion 22 to which the hinge connection unit 30 is directly connected and first and second legs 23 and 24 extending frontward from opposite ends of the connecting portion 22. Facing ends of he first and second legs 23 and 24 are spaced away from each other. That is, the base unit 20 has a "⊏"-shaped section that is an opened curve. The connection portion 22 and the first and second legs 23 and 24 define the rectangular opened portion 21.

Figure 7:
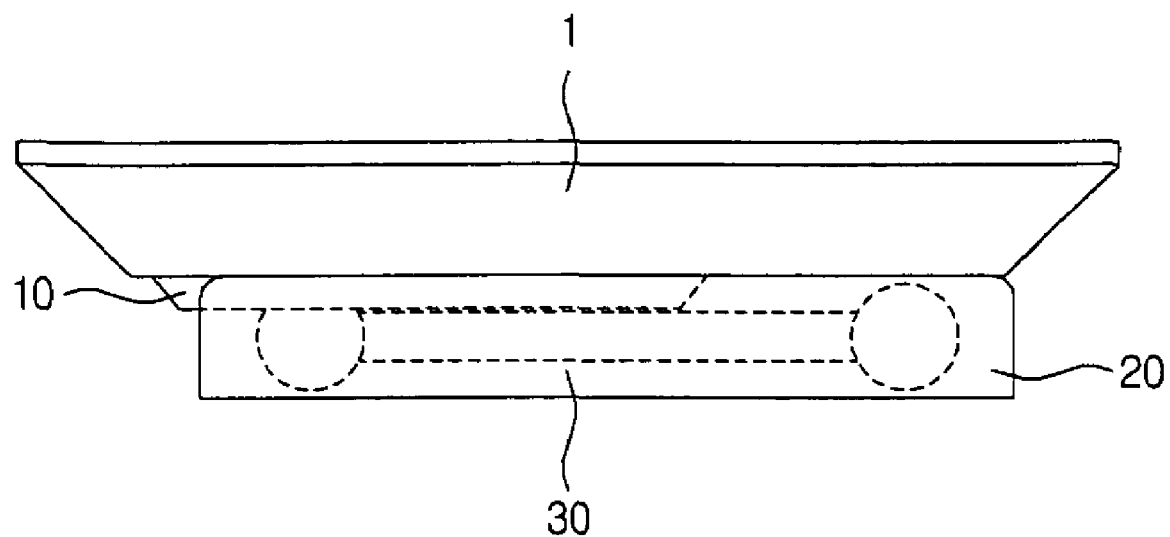
FIG. 7 is a view of the stand of a display device according to an embodiment of the present invention, which it folded.

As shown in FIG. 7, when the stand of a display device is in the folding state, the hinge connection unit is fully inserted in the opened portion 21. Therefore, the overall volume, especially thickness, of the folded stand of a display device is dramatically reduced as compared with the related art stand. Even when the connecting portion 30 is relatively long, there is no need to increase the lengths of the legs 23 and 24 since the base unit has the "⊏"-shaped section. Furthermore, since the base unit has the "⊏"-shaped section corresponding to the shape of the display device, the appearance of the display device assembly having the stand can be improved.

According to the present invention, since the stand of a display device can adjust its height and tilt simultaneously, the user can conveniently adjust the height and angle of the display device using the dual-hinge structure.

In addition, the property of the spring is not deteriorated even when the folding state of the stand keeps for a long time.

Since the main link can be fixed by itself when the stand folds, the structure of the stand can be simplified and the folding and unfolding of the stand can be effectively realized.

Furthermore, when the stand is in the folded state, the stand is reduced in a thickness and stably maintains its folded state. Furthermore, since the hinge connection unit can be stably maintained in the folded state, the size of the base unit can be reduced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A stand of a display device comprising:
   a sliding unit for vertically moving the display device, the sliding unit mounted on the display device, wherein the sliding unit comprises:
      a guide rail unit installed on the display device, wherein the guide rail unit extends in upward and downward directions on a rear surface of the display device;
      an elastic member having an end fixed inside the guide rail unit, wherein the elastic member is expandable along the guide rail unit; and
      a guide body that that is movable along the guide rail unit and that pushes the elastic member as it moves along the guide rail unit;
   a base unit for supporting the display device; and
   a hinge connection unit having a first end pivotally coupled to the guide body of the sliding unit and a second end pivotally coupled to the base unit.

2. The stand of a display device according to claim 1, wherein the guide body slides along guide rails formed on the guide rail unit.

3. The stand of a display device according to claim 1, further comprising a supporting unit for allowing a portion of the guide body to be supported on an upper end of the hinge connection unit.

4. The stand of a display device according to claim 3, wherein the supporting unit is hinge-coupled to the hinge connection unit.

5. The stand of a display device according to claim 1, wherein the guide rail unit and the guide body are formed of plastic.

6. The stand of a display device according to claim 1, wherein the hinge connection unit comprises:
   a supporting unit coupled to the sliding unit and supporting the display device;
   a link unit pivotally coupled between the base unit and the supporting unit;
   a link hinge unit hinge-coupling the supporting unit to the link unit; and
   a base hinge unit binge-coupling the link unit to the base unit.

7. The stand of a display device according to claim 6, wherein the link unit comprises:
   a main link having a first end pivotally connected to the supporting unit and a second end pivotally connected to the base unit;
   an auxiliary link connected between the supporting unit and the base unit, the auxiliary link pivoting about a pivot center eccentric from a pivot center of the main link; and
   an elastic member having first and second ends fixed on the main link and the auxiliary link, respectively.

8. The stand of a display device according to claim 7, wherein the elastic member has a first end fixed to the main link, and wherein the elastic member expands when a main link pivots in a first direction.

9. The stand of a display device according to claim 6, wherein the base binge unit has a folding stopper, the folding stopper comprising:
   a latch supported on the base unit so that it does not rotate relative to the base unit when the link unit folds;
   a rotational unit that rotates relative to the hinge connection unit when the link unit folds; and
   an elastic member biasing the latch and the rotational unit toward each other.

10. The stand of a display device according to claim 9, wherein the latch and the rotational unit contact each other.

11. The stand of a display device according to claim 9, wherein the latch is provided with a projection and the rotational unit is provided with a hook step corresponding to the projection.

12. The stand of a display device according to claim 11, wherein the rotational unit is provided with a seating groove on which the projection seats when the hinge connection unit folds.

* * * * *